(12) United States Patent
Iizuka et al.

(10) Patent No.: US 6,561,156 B2
(45) Date of Patent: May 13, 2003

(54) CYLINDER HEAD APPARATUS

(75) Inventors: Yoshiaki Iizuka, Saitama (JP); Shinji Yamada, Saitama (JP); Sadao Kojima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/143,954

(22) Filed: May 14, 2002

(65) Prior Publication Data
US 2002/0170525 A1 Nov. 21, 2002

(30) Foreign Application Priority Data

May 17, 2001 (JP) .......................................... 2001-148154

(51) Int. Cl.[7] ................................................. F01M 1/00
(52) U.S. Cl. ............................... 123/196 R; 123/90.33; 123/90.31; 123/196 M
(58) Field of Search ........................ 123/196 R, 90.33, 123/196 M, 193.3, 90.31, 195 R, 195 C

(56) References Cited

U.S. PATENT DOCUMENTS 4,944,264 A * 7/1990 Murasaki et al. ....... 123/195 C
6,164,257 A * 12/2000 Kobayashi ............... 123/90.33
6,427,658 B1 * 8/2002 Toyama et al. ......... 123/195 P

FOREIGN PATENT DOCUMENTS

JP        2000-97103       4/2000

* cited by examiner

Primary Examiner—Tony M. Argenbright
Assistant Examiner—Katrina B. Harris
(74) Attorney, Agent, or Firm—Arent Fox Kintner Plotkin & Kahn, PLLC

(57) ABSTRACT

The object of the present invention is to facilitate an appropriate oil supply to the tensioner without a complex apparatus. A valve chamber 3A is formed in a cylinder head 3 which is connected to a cylinder block 2. An opening 23—for discharging the oil in the valve chamber 3A into a chain case 6 which is placed on the side of the cylinder block 2—is formed on a chain case mounting surface 20. Inside the chain case 6 on the chain case mounting surface 20 of the cylinder block 2 are placed a timing chain 15 and a tensioner 30 for applying tension to the timing chain 15. An oil dropping rib 24 for guiding the oil discharged through the opening 23 to the tensioner 30 is provided on the chain case mounting surface 20.

4 Claims, 5 Drawing Sheets

CYLINDER HEAD APPARATUS

FIELD OF THE INVENTION

The present invention relates to a cylinder head apparatus of an internal combustion engine for vehicles and particularly to a cylinder head apparatus, which possesses an opening for returning the oil of the valve chamber of a cylinder head to an oil pan through a chain case.

BACKGROUND OF THE INVENTION

As an example of a cylinder head apparatus for an internal combustion engine, it is disclosed in Japan Laid-Open Patent 2000-97103. In the cylinder head apparatus, the oil which collects in the valve chamber of the cylinder head is discharged into the chain case through the opening, which is placed on the mounting surface of the chain case. The oil is dropped into the chain case, continuously guided to an oil pan.

In the chain case mounted on its mounting surface of the cylinder head and the cylinder block, a timing chain which connects a crankshaft and a camshaft is provided. Also a tensioner for adjusting the tension of the timing chain and a chain guide for guiding the timing chain are often prepared in the chain case. When such tensioner and chain guide are employed, oil must be supplied to the sliding portions of the tensioner and the chain guide for lubrication.

However, there has existed a problem that a special lubricating oil path—which is for supplying the oil to the sliding portions of the tensioner and the chain guide—renders the cylinder head too bulky.

SUMMARY OF THE INVENTION

The object of the present invention is to facilitate an appropriate oil supply to the sliding portions of the tensioner and the chain guide while obviating the accompanying need for the bulkiness of the cylinder head.

The present invention to solve the problem mentioned above provides a cylinder head apparatus comprising: a cylinder head connected to a cylinder block; a valve chamber which is formed in the cylinder head; a chain case provided on the side of the cylinder block; and an opening which is provided on a mounting surface of the chain case for discharging an oil of the valve chamber into the chain case, wherein a timing chain and at least either a tensioner for applying tension to the timing chain or a chain guide for guiding the timing chain are disposed on the mounting surface of the chain case of the cylinder block inside the chain case, and wherein an oil dropping rib for guiding the oil, which is discharged through the opening, to a sliding portion of the tensioner or the chain guide is provided on the mounting surface of the chain case.

The invention employs the oil dropping rib for guiding the oil—which is discharged through the opening—to the sliding portion of the tensioner which is for applying the tension to the timing chain, or of the chain guide which is for guiding the timing chain. The oil discharged from the valve chamber can thus be efficiently used in order to lubricate the sliding portion of the tensioner or the chain guide. Therefore, an appropriate oil supply to the sliding portion of the tensioner or the chain guide can be attained without preparing a special lubricating oil path for the cylinder head.

The invention provides the cylinder head apparatus wherein the opening is formed on a boss projecting from the mounting surface of the chain case of the cylinder head, and the oil dropping rib is connected to be flush with the boss.

The invention employs the opening for discharging the oil, which is formed on the boss projecting from the mounting surface of the chain case of the cylinder head. The boss is flush with the oil dropping rib. The oil discharged through the opening will travel straight to the oil dropping rib and reach the tensioner guided by the oil dropping rib. Therefore, the oil discharged through the opening can be guided to the tensioner securely.

The reduction in the stiffness of the cylinder head due to providing an opening thereon is restrained since the opening is formed on the boss.

The invention provides the cylinder head apparatus wherein the oil dropping rib is connected to a plurality of connecting ribs, which interconnect a plurality of mounting bosses and are provided on the cylinder head.

The invention provides the cylinder head apparatus wherein the oil dropping rib is connected to the plurality of connecting ribs, which interconnect the plurality of mounting bosses and are provided on the cylinder head.

In the invention the oil dropping rib is connected to the connecting ribs which interconnect the bosses, thereby increasing the stiffness of the cylinder head.

The resultant stiffness of the chain case can also be increased by connecting a plurality of the bosses.

DESCRIPTION OF THE PREFERRED EMBODIMENTS

The embodiment of the present invention will now be described with reference to the accompanying drawings.

Figure 1:
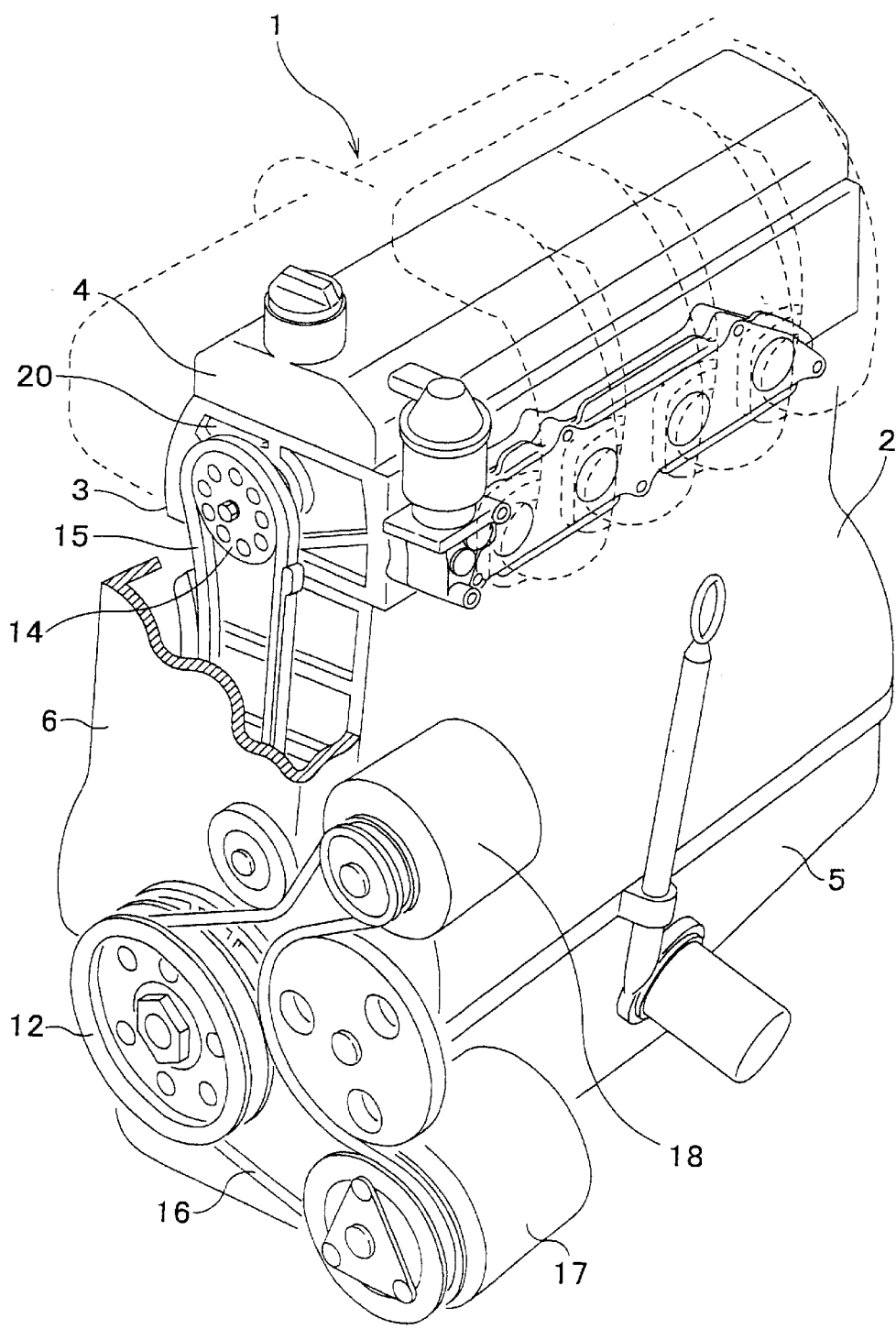
FIG. 1 is a perspective view showing an engine to which the cylinder head apparatus according to the present invention is applied.
Figure 2:
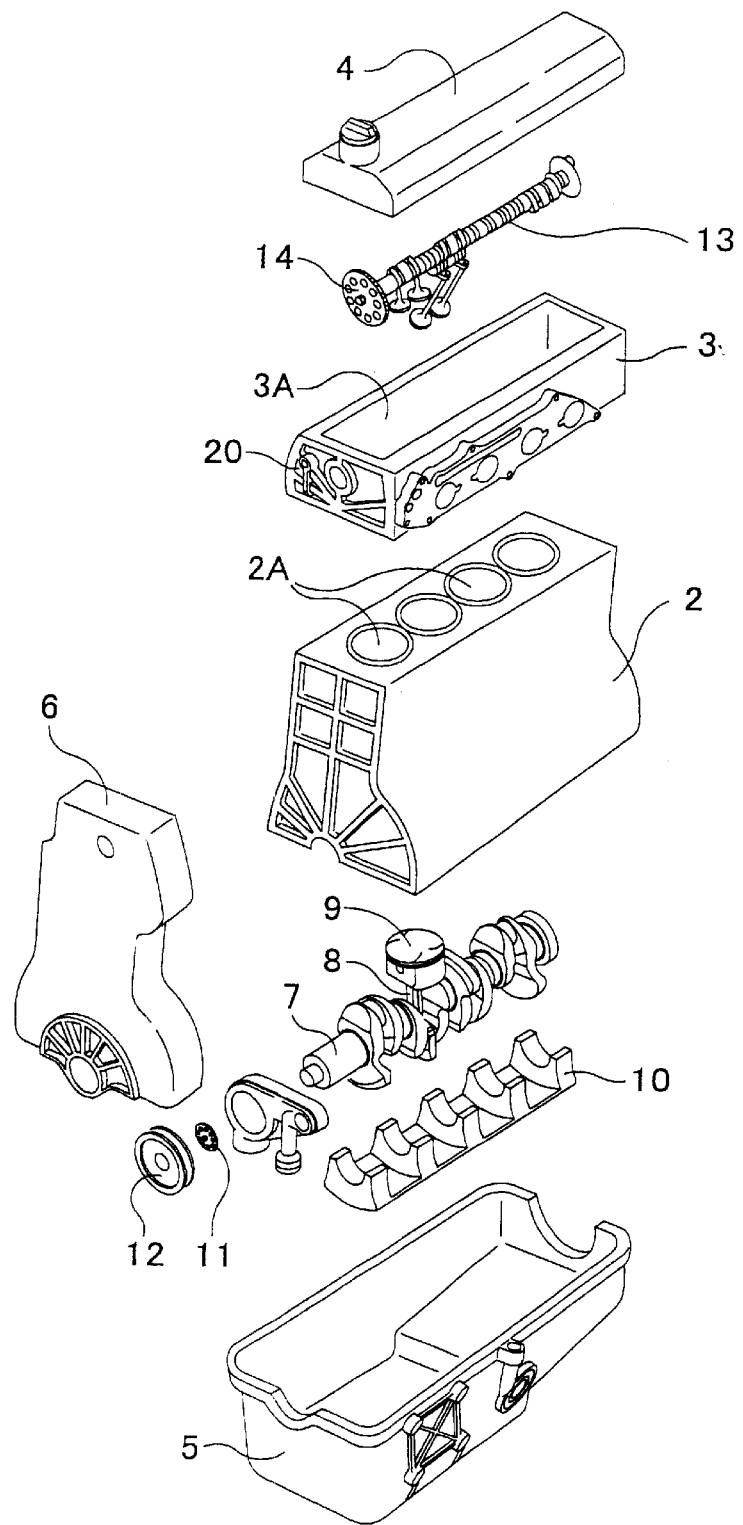
FIG. 2 is an exploded perspective view illustrating the engine shown in FIG. 1.

FIG. 1 is a perspective view of an engine, to which the cylinder head apparatus according to the present invention is applied. FIG. 2 is an exploded perspective view illustrating the engine shown in FIG. 1.

A cylinder head apparatus according to the embodiment of the present invention is, for example, applied to an engine 1 for a vehicle shown in FIG. 1. The engine 1 is a four-cylinder in-line engine of SOHC (Single Over Head Cam). To the top end of a cylinder block 2 are connected a cylinder head 3 and a cylinder head cover 4 in this order, and to the bottom end of the cylinder block 2 is connected an oil pan 5. A chain case 6 is mounted on one side of the engine 1 lying across the cylinder block 2 and the cylinder head 3.

As shown in FIG. 2, on the top of the cylinder block 2 are formed four cylinder bores 2A in line, into each of which a piston 9—connected to a crankshaft 7 through a connecting rod 8—is inserted slidably. The crankshaft 7 is mounted rotationally free on the lower portion of the cylinder block 2 by an integrated bearing cap 10. At one end of the crankshaft 7 protruding from the cylinder block 2 a crank sprocket 11 and a crank pulley 12 are secured.

A camshaft 13 is supported rotationally free and housed in a valve chamber 3A of the cylinder head 3, which is covered by the cylinder head cover 4. A cam sprocket 14 is fixed at end of the camshaft 13, which penetrates a chain case mounting surface 20 of the cylinder head 3. As shown in FIG. 1, a timing chain 15 is wound around the crank sprocket 11 and the cam sprocket 14, thus providing a power transmission mechanism of the crankshaft 7 to the camshaft 13. The engine 1 shown in FIG. 1 includes a compressor 17 for an air conditioning unit and an AC generator 18, which are driven by the crank pulley 12 and a belt 16.

Figure 3:
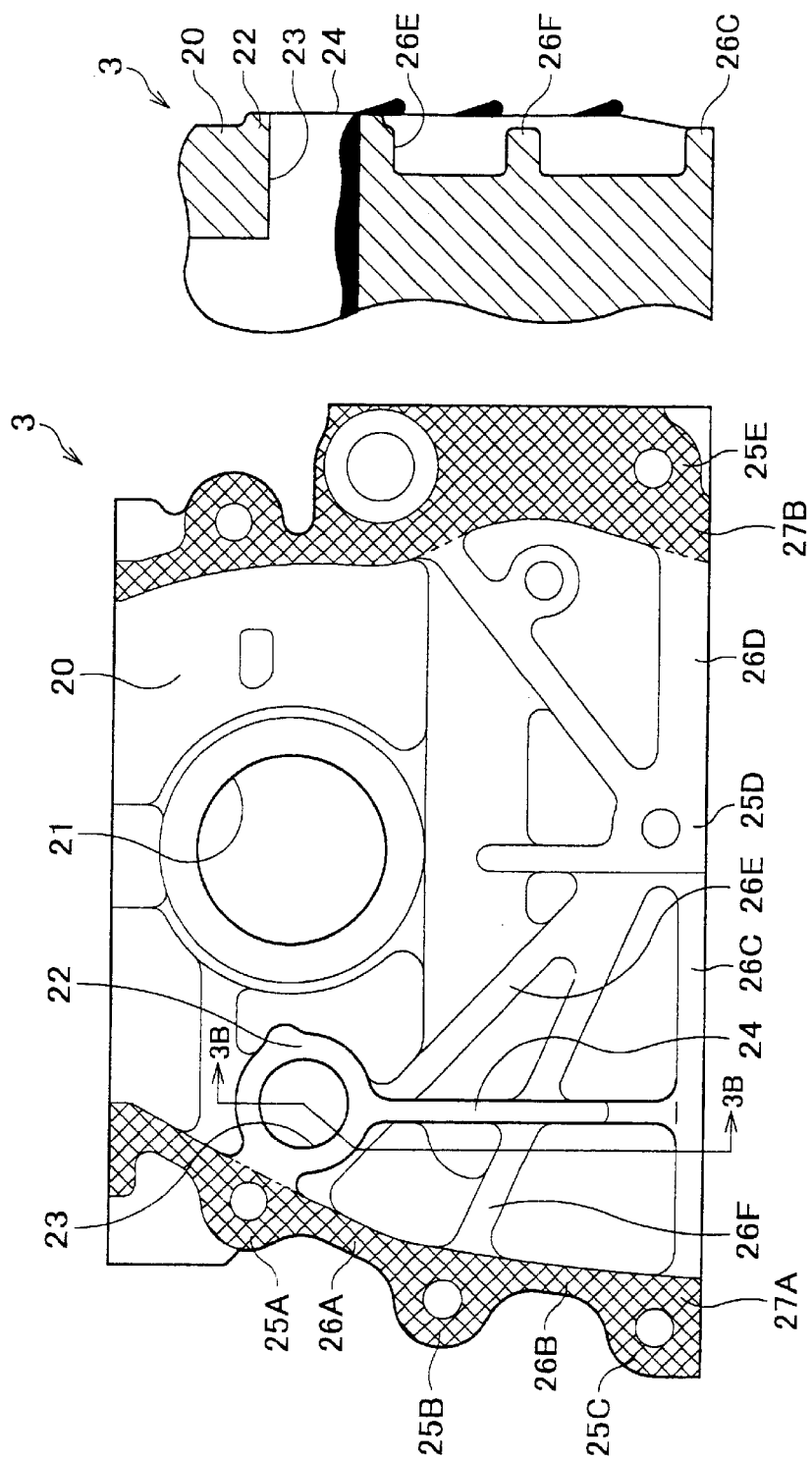
FIG. 3A is a front view showing the chain case mounting surface of the cylinder head.
FIG. 3B is a sectional view taken along the line 3B—3B shown in FIG. 3A.

As shown in FIG. 3A, a boss 22 projects from the chain case mounting surface 20 of the cylinder head 3, lying next to a cam sprocket mounting portion 21 which is for supporting the camshaft 13. An opening 23 for dropping the oil is formed on the boss 22. The opening 23 communicates with a valve chamber 3A of the cylinder head 3, thereby capable of discharging the oil which is in the valve chamber 3A. An oil dropping rib 24 extends from the lower portion of the boss 22. The oil dropping rib 24, as shown in FIG. 3B, is so arranged that it is flush with the boss 22 to a given position in a vertical direction and recedes thereof toward the chain case mounting surface 20. The oil dropping rib 24 thus allows the oil discharged through the opening 23 to continuously flow downward traveling on it.

Mounting bosses 25A–25E which are for mounting the chain case 6 (see FIG. 1) are provided around the cylinder head 3. The mounting bosses 25A–25E are interconnected by connecting ribs 26A–26F. For example, the mounting bosses 25A and 25B are interconnected by the connecting rib 26A, and the mounting bosses 25B and 25C by the connecting rib 26B. These mounting bosses 25A–25E are flush with the connecting ribs 26A, 26B and 26D. Thus, the mounting bosses 25A, 25B, 25C and 25E, and the connecting ribs 26A and 26B adhere to the chain case 6 to form a fluid tight seal surface 27A. Similarly a seal surface 27B is formed in the upper section of the mounting bosses 25. Therefore, the oil can pass over the connecting ribs 26C–26F in the chain case 6. The oil dropping rib 24 extends downward from the boss 22 and its lower end is connected to the connecting rib 26C. As shown in FIG. 3B, the oil dropping rib 24 has a slope at its lower portion since the height of the connecting rib 26C is formed lower than that of the boss 22.

Figure 4:
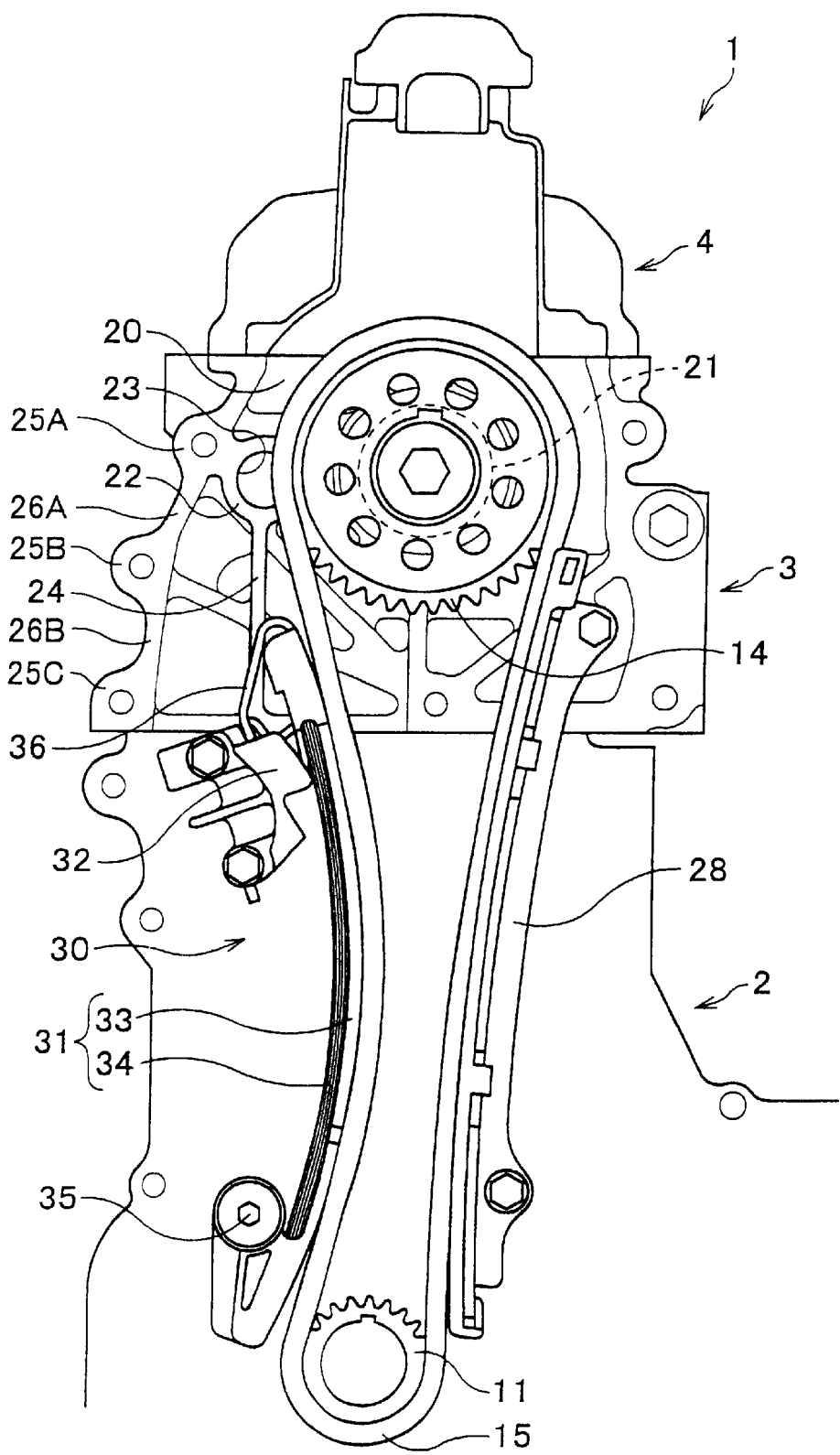
FIG. 4 is a side view showing the engine shown in FIG. 1 without the chain case.

As shown in FIG. 4, the timing chain 15 is wound around the cam sprocket 14 mounted on the cylinder head 3 and the crank sprocket 11 mounted on the cylinder block 2. On one side of the timing chain 15 is disposed a chain guide 28 which contacts it slidable, and on the other side—a tensioner 30 for applying tension to the timing chain 15.

The tensioner 30 includes a tensioner main body 31 and a slider 32 of a supporting member. The tensioner main body 31 possesses a blade shoe 33 and a leaf spring 34. The timing chain 15 slides on the front sliding surface of the blade shoe 33, which is made of a synthetic resin such as nylon. The leaf spring 34 lies in contact with the back surface of the blade shoe 33, and is made of a multi-layered—for example 5-layered—integrated plate spring. The leaf spring 34 elastically presses the blade shoe 33 toward the timing chain 15. Each end of the leaf spring 34 is inserted into the groove provided at each end of the blade shoe 33, thereby supported by the blade shoe 33. The plurality of the plate springs must not necessarily be fixed each other to be an integrated member but they may alternatively be layered without fixing each other.

The blade shoe 33 has a given width (in the direction normal to the sheet of FIG. 4) and a shape of arc. The bottom end portion of the blade shoe 33 is held rotationally free by a supporting axis 35, which is fixed on the crank sprocket 11 side of the cylinder block 2. The top end portion 36 of the blade shoe 33 is held by the slider 32 slidably in contact with a guide surface provided on the slider 32, in the vicinity of the mating surface of the cylinder block 2 and the cylinder head 3 lying across both of them. The top end portion 36 is slidably in contact with the slider 32 so that the timing chain 15 presses the tensioner main body 31. Thereby, the blade shoe 33 will be slidably in contact with the timing chain 15. The leaf spring 34 thus elastically applies the appropriate magnitude of tension to the timing chain 15.

The guide surface provided on the slider 32 is a plane—sloping down to the timing chain 15—so that the closer to the timing chain 15 the portion of the guide surface lies, the more it may approach the bottom end portion of the blade shoe 33. The tensioner main body 31 can thus be displaced to press the timing chain 15 further when the timing chain 15 loosens. The degree of pressing the timing chain 15 by the elastic force of the leaf spring 34 can be adjusted depending on the slope.

When the timing chain 15 loosens, the elastic force of the leaf spring 34 increases the curvature of the tensioner main body 31, thereby allowing the top end portion 36—interposed between the guide surface and the timing chain 15—to slide on the guide surface in the direction to press the timing chain 15. On the other hand, it slides in the opposite direction when the timing chain 15 is tightened.

The lower end of the oil dropping rib 24 formed on the cylinder head 3 extends up to the top end portion 36 of the blade shoe 33.

The function and effect of the present invention will be described.

Figure 5:
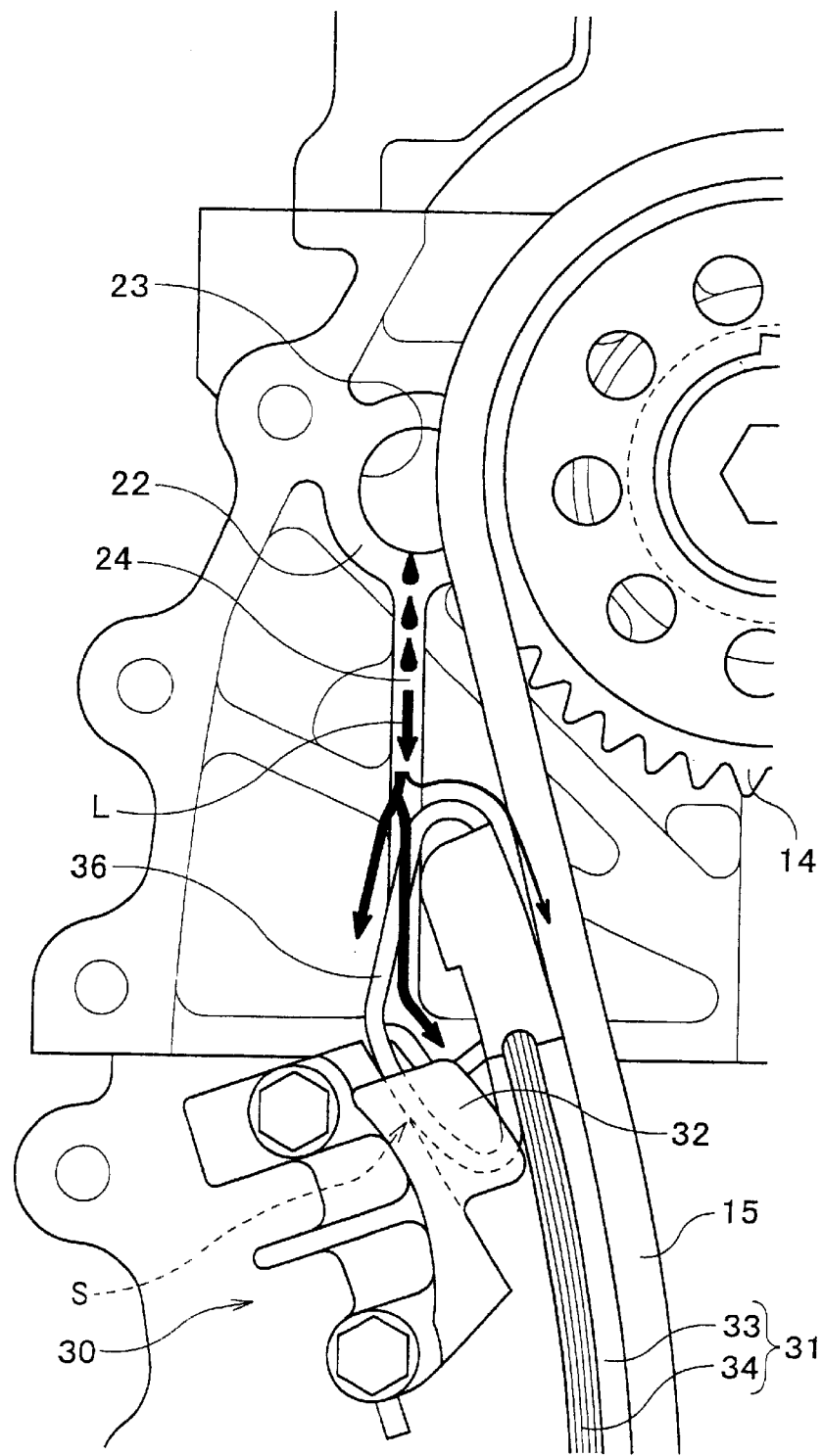
FIG. 5 is a figure describing the oil flow discharged through the opening.

The oil existing in the front of the cylinder head 3 is discharged into the chain case 6 (see FIG. 1) through the opening 23 of the boss 22. As shown in FIG. 5, oil L discharged through the opening 23 flows down on the oil dropping rib 24. The top end portion 36 of the blade shoe 33 is placed in the lower portion of the oil dropping rib 24. Therefore, the oil L discharged through the opening 23 reaches the top end portion 36 traveling on the oil dropping rib 24. As shown in FIG. 3B, the boss 22 with the opening 23 is flush with the oil dropping rib 24 but the connecting ribs 26E and 26F are placed receding from the oil dropping rib 24. The oil L discharged through the opening 23 can thus be guided to the top end portion 36 of the blade shoe 33 securely traveling on the oil dropping rib 24.

Most of the oil L guided to the top end portion 36 flows into the opposite side of the timing chain 15. It continuously flows down into a sliding portion S between the top end portion 36 and the slider 32, some of which flows into the space between the top end portion 36 and the plate spring 34. On the other hand, a little amount of the oil L flows into the timing chain 15 side of the top end portion 36. In this connection, another oil supply unit (not shown) is prepared for supplying the timing chain 15 with the oil.

The oil L flowing into the sliding portion S lubricates it, and the oil flowing into the space between the top end portion 36 and the plate spring 34 lubricates both of them. The oil L then falls back into the oil pan 5 (see FIG. 1). The oil L discharged through the opening 23 is thus guided to the top end portion 36 of the blade shoe 33 traveling on the oil dropping rib 24. Therefore, the oil L is guided reliably to the sliding portion S between the top end portion 36 and the slider 32, and the space between the top end portion 36 and the plate spring 34, thereby applying the lubrication to them.

The oil dropping rib 24 is connected to the mounting boss 25A by the boss 22. Similarly, the oil dropping rib 24 is connected to the mounting bosses 25A, 25B and 25D by the connecting ribs 26E and 26F. The lower end of the oil dropping rib 24 is connected to the connecting rib 26C. All these connections enable the resultant high stiffness of the cylinder head 3.

In the embodiment of the present invention described above, the oil dropping rib 24 is prepared, which guides the oil discharged through the opening 23 to the tensioner 30. As an alternative, another oil dropping rib can be employed, which guides the oil to the sliding portion of the chain guide 28, or to both the tensioner 30 and the chain guide 28 respectively.

Even if the engine is mounted on a vehicle in the manner that it is tilted toward the opening 23, the oil dropping rib 24 is still capable of supplying the oil L properly to the sliding portion of the tensioner 30 or the chain guide 28.

What is claimed is:

1. A cylinder head apparatus comprising:

a cylinder head connected to a cylinder block;

a valve chamber which is formed in said cylinder head;

a chain case provided on the side of said cylinder block; and an opening which is provided on a mounting surface of said chain case for discharging oil of said valve chamber into said chain case, wherein a timing chain and at least either a tensioner for applying tension to said timing chain or a chain guide for guiding said timing chain are disposed on the mounting surface of said chain case of said cylinder block inside said chain case, wherein an oil dropping rib for guiding said oil, which is discharged through said opening, to a sliding portion of said tensioner or said chain guide is provided on the mounting surface of said chain case.

2. The cylinder head apparatus according to claim 1, wherein said opening is formed on a boss projecting from the mounting surface of said chain case of said cylinder head, and said oil dropping rib is connected to be flush with said boss.

3. The cylinder head apparatus according to claim 1, wherein said oil dropping rib is connected to a plurality of connecting ribs, which interconnect a plurality of mounting bosses and are provided on said cylinder head.

4. The cylinder head apparatus according to claim 2, wherein said oil dropping rib is connected to said plurality of connecting ribs, which interconnect said plurality of mounting bosses and are provided on said cylinder head.

* * * * *

UNITED STATES PATENT AND TRADEMARK OFFICE
CERTIFICATE OF CORRECTION

PATENT NO. : 6,561,156 B2
DATED : May 13, 2003
INVENTOR(S) : Iizuka et al

It is certified that error appears in the above-identified patent and that said Letters Patent is hereby corrected as shown below:

Column 6,
Lines 24 and 25, change "said" and substitute therefor -- a --.

Signed and Sealed this

Seventh Day of September, 2004

JON W. DUDAS
*Director of the United States Patent and Trademark Office*